July 17, 1923.
I. C. BICE
1,462,002
SAFETY CRANK
Filed June 23, 1921
3 Sheets-Sheet 2
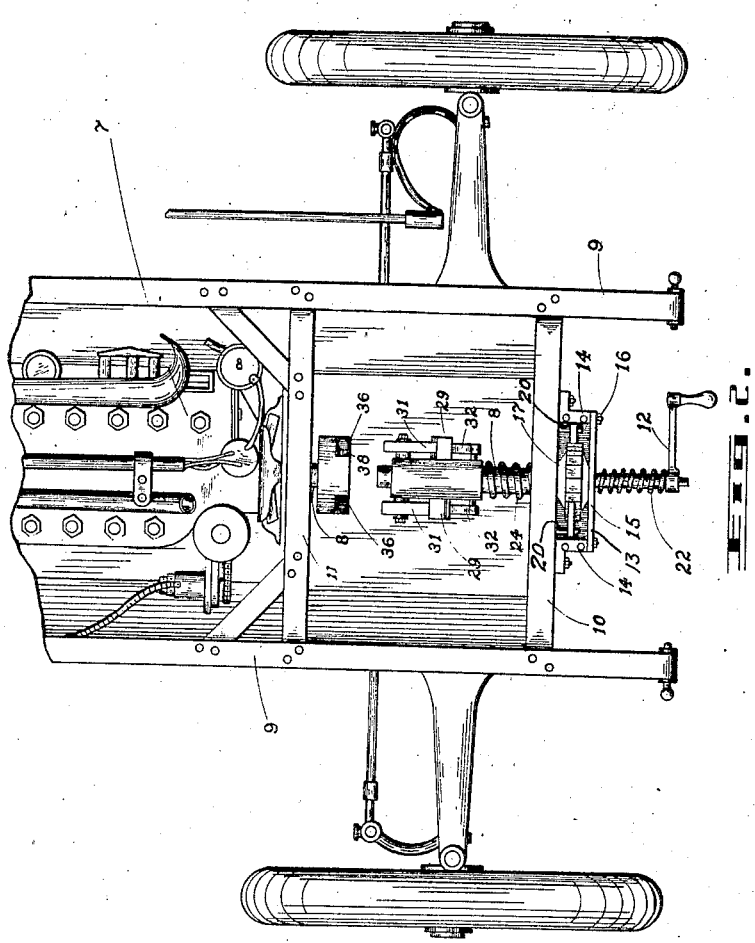
INVENTOR
IVOR C. BICE.
BY *E. W. Amd*
ATTORNEY

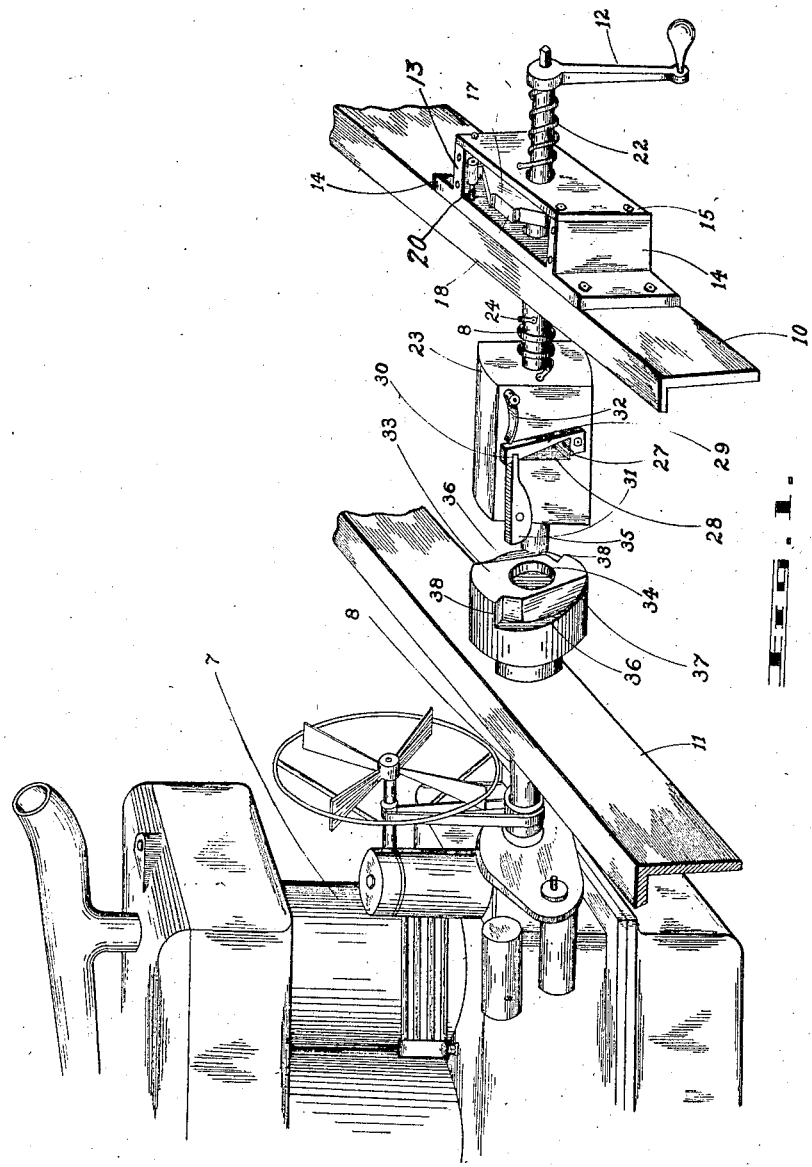

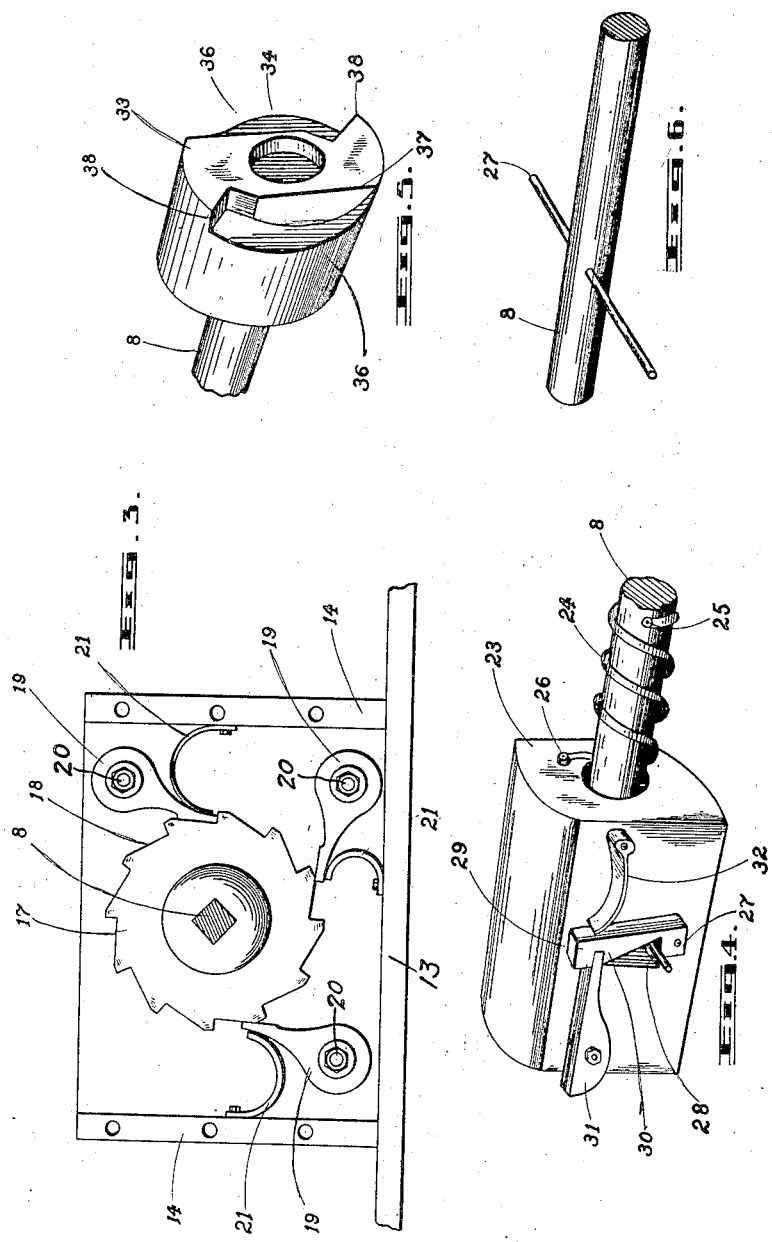

Patented July 17, 1923.

1,462,002

UNITED STATES PATENT OFFICE.

IVOR CHARLES BICE, OF CLANDEBOYE, ONTARIO, CANADA.

SAFETY CRANK.

Application filed June 23, 1921. Serial No. 479,914.

*To all whom it may concern:*

Be it known that I, IVOR C. BICE, a citizen of the Dominion of Canada, residing at Clandeboye, in the county of Middlesex and Province of Ontario, Canada, have invented certain new and useful Improvements in Safety Cranks, of which the following is a specification.

The present invention relates to improvements in internal combustion engines and more particularly refers to the cranking mechanism of the same. As it is well known, in cranking internal combustion engines the engine often backfires, thus throwing the crank in an opposite position to that employed in cranking the same. This backfire, if severe, often injures the operator.

To overcome this objectionable feature, I provide a device which consists in the construction, combination and arrangement of parts as will be hereinafter fully described, illustrated in the accompanying drawings and pointed out in the claim hereunto appended.

Figure 1 is a perspective view illustrating an embodiment of my present invention.

Figure 2 is a top plan view illustrating my present invention embodied with an automobile engine.

Figure 3 is an end elevation illustrating the ratchet member in detail.

Figure 4 is a fragmental perspective view of the member functioned to disengage the crank shaft.

Figure 5 is a similar view of one of the members employed in the disengaging of the crank shaft.

Figure 6 is a fragmental perspective view of the ratchet disengaging member.

Referring to the drawings, like numerals designate like parts in the various drawings.

The numeral 7 indicates the internal combustion engine, 8 the crank shaft. Referring to Figure 2, which more clearly illustrates the embodiment of my present invention, the numeral 9 indicates the frame of the chassis of the automobile on which the internal combustion engine is mounted. 10 and 11 illustrate the transverse angle iron in which the crank shaft journals are positioned. The outer end of the crank shaft is square in shape and has crank 12 positioned on its outer end for manual actuation. A casing 13 is positioned on the outer periphery of the angle iron and has lug members 14 extending outwardly from it. Face plate 15 is substantially connected to the lug member 14 by means of the bolt 16 positioned in threaded apertures configurated in the lug members 14. Ratchet wheel 17 is mounted on the crank shaft intermediate the outer periphery of the angle iron 10 and the face plate 15, and has teeth 18 configurated on its circumferential periphery. A plurality of dogs, indicated by the numeral 19, are positioned on the bolts 20, substantially mounted on the angle iron 10. These dog members are engageable with the teeth 18 of the ratchet member 17 and are tensioned against the same by springs 21. Coil spring 22 is positioned over the square end of the crank shaft and is functioned to keep the crank shaft in disengaged position. The disengaging members consist of a body member 23 loosely positioned on the rounded portion of the crank shaft indicated by the numeral 8. Coil spring 24 is positioned intermediate the body member 23 and the inner periphery of the angle iron 10. The coil spring is attached on one end to the crank shaft 8 by means of a rivet 25 and at its opposite end to the body member 23 by the rivet 26. Rod 27 is transversely positioned through the crank shaft 8 and through the triangular shaped aperture 28 positioned transversely in the body member 23. The disengaging members consist of dogs 29 pivotally mounted on each side of the body member 23 and have transverse openings 30 configurated in them for engagement with the lever arm 31, pivotally mounted on the body member 23. Springs 32, substantially mounted on the body member 23, tension against the dog members 29, and are functioned to keep the dog members 29 normally in engagement with the lever member 31. Member 33 is positioned on the end of the crank shaft as indicated diagrammatically and is functioned to engage with the body member 23. Opening 34 is positioned on its outer face for engagement with the end 35 of the crank shaft 8. Openings 36 are positioned on the circumferential periphery for engagement with the lever members 31. The numeral 37 indicates a portion slanted in alignment with the outer face of the member 33 and functioned to re-engage the lever and dog members as in their normal position. Abutment 38 is positioned as illustrated for engagement with the lever members 31.

When it is desired to crank the engine, handle 12 positioned on the crank shaft is grasped and the crank shaft 12 pushed inwardly until the body member 23 engages with the member 33. In this position, the lever members 31 will be engaged with the openings 36 configurated on the member 33.

When the crank is actuated, the lever members 31 rest against the abutment 38. The coil spring 24 is functioned to exert enough tension to keep the spring 32 pressed against the lever member 31 and thus keep the lever members 31 normally engaged with the dog members 29. Should the engine now back-fire, the body member 23 will turn side ways and the transverse rod 27 will tension against the angular face of the dog members 29. One of the dog members 19 will engage with one of the teeth 18 positioned on the circumferential periphery of the ratchet member 17 and prevent rotation of the crank shaft. The transverse rod 27 will now force the dog members 29 backward, thus disengaging the lever members. The lever members will now be vertical in position, in alignment with the body member 23.

When it is desired to re-engage the lever member 31 with the dog member 29, the crank 12 is actuated in the opposite direction and the end of the lever member will slide along the angular surface 37 and the lever member 31 will then re-engage the dog member 29.

The spring 24 is tensioned to turn the engine crank shaft in starting the engine, but will give on the sudden impulse of a back fire which results in the angular sides of the members 29 being thrust against the cross rod 27 which is fixed in the shaft 8, with the result that the member 29 is forced against the spring 32 which, giving way allows the members 31 to be displaced in a vertical position relative to the abutments 38, thus disconnecting the engine crank shaft from the starting handle. The spring 32 is also designed to be of sufficient tension to hold the members 31 in operative position relative to the abutments 38 in the starting operation, but of insufficient tension to resist the thrust of the rod 27 against the members 29 in case of back fire.

What I claim as new is:

A safety cranking device for automobile engines, comprising, in combination, a hand crank fixedly attached to a stub starting shaft; a ratchet wheel fixed thereon; dog means preventing backward rotation of said stub shaft; a slotted box-like member oscillatable on said stub shaft; a pin fixed in said stub shaft projecting through the slots of said box-like member; a pair of inter-engaging pawl members pivoted on said box-like member, spring-held in operative relation thereto; engaging means at the forward end of said box-like member to engage similar means on the end of the crank shaft of the engine, spring means for withdrawing said box-like member from said engine crank shaft, said pin cooperating with said pair of pawl members to release said box-like member from engagement with said engine crank shaft on a retrograde movement of the engine crank shaft.

In testimony whereof, I affix my signature in the presence of two witnesses.

IVOR CHARLES BICE.

Witnesses:
M. L. BANTING,
R. J. CARTER.